United States Patent
Luther et al.

(10) Patent No.: US 10,112,135 B2
(45) Date of Patent: Oct. 30, 2018

(54) FILTER ELEMENT AND ASSEMBLY WITH BYPASS REVERSE FLOW FILTER END CAP

(71) Applicant: Parker-Hannifin Corporation, Cleveland, OH (US)

(72) Inventors: Kenneth Luther, Metamore, OH (US); Albert F. Cella, Metamore, OH (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 280 days.

(21) Appl. No.: 14/164,835

(22) Filed: Jan. 27, 2014

(65) Prior Publication Data

US 2014/0202939 A1 Jul. 24, 2014

Related U.S. Application Data

(63) Continuation of application No. 12/596,120, filed as application No. PCT/US2008/060178 on Apr. 14, 2008.

(60) Provisional application No. 60/911,641, filed on Apr. 13, 2007.

(30) Foreign Application Priority Data

Apr. 14, 2008 (EP) .................................. 08799798

(51) Int. Cl.
*B01D 35/147* (2006.01)
*B01D 29/15* (2006.01)

(52) U.S. Cl.
CPC ......... *B01D 35/1475* (2013.01); *B01D 29/15* (2013.01); *B01D 35/147* (2013.01); *B01D 2201/295* (2013.01); *B01D 2201/4076* (2013.01)

(58) Field of Classification Search
USPC ................................................ 210/130, 137
See application file for complete search history.

(56) References Cited

U.S. PATENT DOCUMENTS

| | | | |
|---|---|---|---|
| 2,056,756 | A | 6/1935 | Wiedhofft |
| 3,246,760 | A | 4/1966 | Keel |
| 3,503,506 | A | 3/1970 | Kudlaty et al. |
| 3,586,171 | A | 6/1971 | Offer |
| 3,908,693 | A | 9/1975 | Cooper |
| 4,279,746 | A | 7/1981 | Leutz |
| 4,497,706 | A | 2/1985 | Pickett et al. |
| 4,657,040 | A | 4/1987 | Torres |
| 4,883,083 | A | 11/1989 | Fisher et al. |
| 5,006,235 | A | 4/1991 | Cooper |

(Continued)

FOREIGN PATENT DOCUMENTS

EP 1 136 666 9/2001

OTHER PUBLICATIONS

International Search Report for corresponding application No. PCT/US2008/060178 dated Apr. 14, 2008.
U.S. Appl. No. 12/596,120, filed Apr. 19, 2010.

*Primary Examiner* — Dirk R Bass
(74) *Attorney, Agent, or Firm* — Renner, Otto, Boisselle & Sklar, LLP

(57) ABSTRACT

A filter element includes in an end cap assembly an internal bypass valve such that the bypass valve can be replaced along with the filter element. Additionally or alternatively, the filter element end cap assembly has a reverse flow valve for enabling reverse flow across the filter element without passage through filter element.

20 Claims, 12 Drawing Sheets

(56) References Cited

U.S. PATENT DOCUMENTS

| | | | |
|---|---|---|---|
| 5,284,579 A * | 2/1994 | Covington | B01D 27/08 |
| | | | 210/130 |
| 5,501,791 A | 3/1996 | Theisen et al. | |
| 5,538,626 A | 7/1996 | Baumann | |
| 5,670,042 A | 9/1997 | Clausen et al. | |
| 6,409,786 B1 | 6/2002 | Wright et al. | |
| 6,485,635 B1 | 11/2002 | Gandini et al. | |
| 6,579,448 B2 | 6/2003 | Dworatzek | |
| 6,887,376 B2 | 5/2005 | Cella et al. | |
| 2006/0283503 A1 * | 12/2006 | McCausland | F16K 1/126 |
| | | | 137/219 |

* cited by examiner

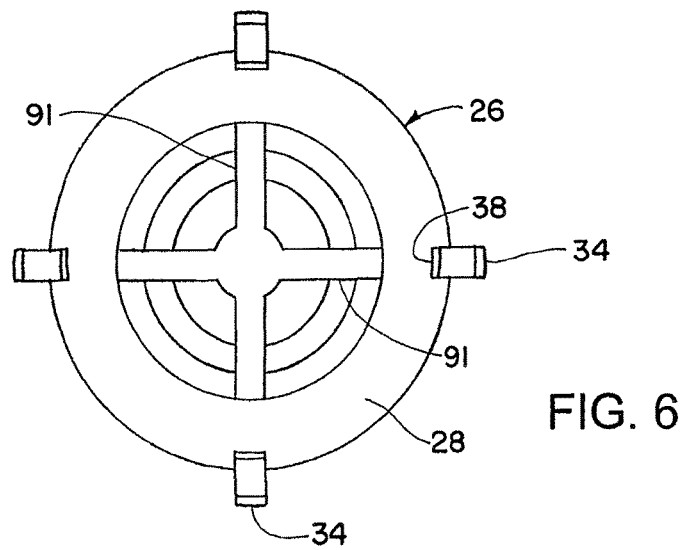
FIG. 6
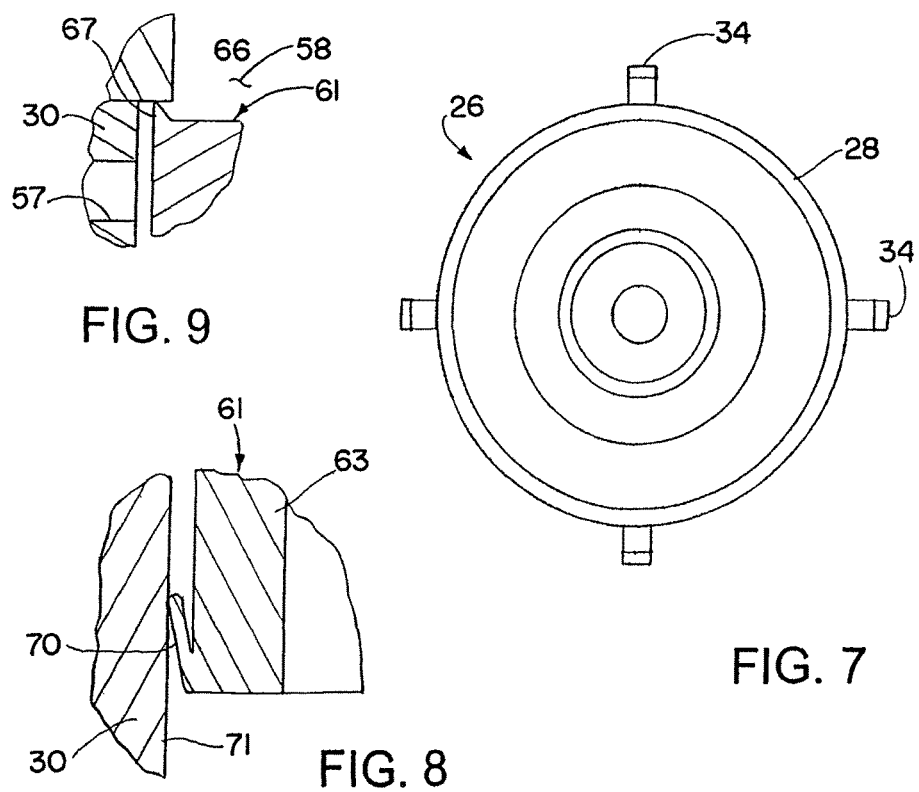
FIG. 9
FIG. 7
FIG. 8

FILTER ELEMENT AND ASSEMBLY WITH BYPASS REVERSE FLOW FILTER END CAP

RELATED APPLICATION DATA

This application claims priority of U.S. application Ser. No. 12/596,120 filed Apr. 19, 2010 as a National Phase of PCT/US08/60178 filed Apr. 14, 2008 which claims priority U.S. Provisional Application No. 60/911,641 filed on Apr. 13, 2007, which is hereby incorporated herein by reference in its entirety.

FIELD OF THE INVENTION

The herein described invention relates generally to fluid filters and, more particularly, to hydraulic fluid filters used in hydraulic systems.

BACKGROUND OF THE INVENTION

Filter assemblies have been employed in a variety of applications including hydraulic systems, fuel systems and engine lubrication systems. Such assemblies heretofore have used replaceable filter elements that can be installed on a filter head for filtering fluid flowing between inlet and outlet passages in the filter head. The filter element typically is contained within a housing such as a can that can be screwed onto or off of the filter head. In a so-called spin-on filter, the can is discarded along with the filter element. In other arrangements, only the filter element is replaced and the housing is reused.

During use the filter element may become clogged to the point that is causes a problem in the system, such as inadequate flow to components downstream of the filter, excessive pressure upstream of the filter element, and/or damage to the filter element allowing the accumulated contaminants to flow to components downstream of the filter element. Normally this is avoided by scheduled replacement of the filter element, but sometimes this is not done at the scheduled time or the filter element becomes clogged prior to the scheduled replacement because of particularly dirty conditions, for example. Consequently, provision heretofore has been made to allow fluid to bypass the filter element to allow for adequate, albeit unfiltered flow to components downstream of the filter element, to prevent damage to the filter element, and/or to prevent excessive pressure buildup upstream of the filter element. Fluid bypass is also desirable to avoid problems created during cold starts and flow surge conditions. Heretofore bypass valves were provided in the filter head for diverting flow from the inlet passage directly to the outlet passage, and thus bypassing the filter element, when the pressure differential across the filter element exceeded a prescribed amount.

SUMMARY OF THE INVENTION

The present invention provides a novel filter element that includes an internal bypass valve such that the bypass valve can be replaced along with the filter element. This avoids problems associated with prior filter assemblies where the bypass valve is provided in a filter head, and thus over time can become worn and/or dirty such that the bypass valve no longer functions properly. Additionally or alternatively, the filter element has a reverse flow valve for enabling reverse flow across the filter element without passage through filter element. This permits, for example, fluid downstream of the filter element to flow back to the fluid supply without passage through the filter media of the filter element, as may be desirable in many applications and particularly in hydraulic systems where it is desirable to prevent pressure buildups downstream of the filter element when the hydraulic system is idle. The filter element preferably is replaceable independently of a housing that is securable to a filter head, or the filter element may be integral with the housing, such as a can, in the case of a spin-on filter.

More particularly, a filter element according to one aspect of the invention comprises a filter media and an end cap assembly at one end of the filter media. The end cap assembly includes an end cap that includes an annular peripheral flange portion for engaging an end face of the filter media, and a central tubular portion forming with the filter media an interior fluid flow passage. The central tubular portion has an opening at an axial end thereof and an annular wall including at least one radial bypass flow passage for allowing fluid supplied to one side of the central tubular portion to bypass the filter element and flow to an opposite side of the central tubular portion. The end cap assembly further comprises a bypass flow valve axially movable within the central tubular portion between a closed position blocking flow from the radial bypass flow passage to the opening at the axial end of the central tubular portion and an open position permitting flow of fluid from the radial bypass flow passage to the opening at the axial end of the central tubular portion. The bypass flow valve is responsive to a prescribed pressure differential across the central tubular portion for moving the bypass flow valve from the closed position to the open position to permit flow through the bypass flow passage.

Various embodiments of the filter element according to the above and other aspects of the invention may include one or more of the following features.

For instance, the end cap may have an annular bypass valve seat surrounding the interior flow passage, and the bypass flow valve may have an annular valve sealing surface for seating against the bypass valve seat to block flow from the radial bypass flow passage to the opening at the axial end of the central tubular portion.

The annular valve sealing surface may be formed by an axially protruding peripheral lip on the bypass flow valve.

The bypass flow valve may have a tubular portion telescopically movable within the central tubular portion, and the peripheral lip may protrude from an axial end face of the tubular portion of the bypass flow valve.

The tubular portion may have a radially outwardly protruding annular sealing portion for sealing against an interior surface of the central tubular portion at a location remote from the peripheral lip, which sealing portion is exposed to pressure of fluid in the bypass flow passage.

The bypass flow valve may be resiliently biased toward its closed position, such that the bypass flow valve will be held in its closed position until the pressure differential across the annular sealing portion exceeds a prescribed amount causing the bypass flow valve to move to its open position.

The annular sealing portion may be formed by a wiper seal oriented such that fluid pressure at its side in fluid communication with the bypass flow passage will cause the wiper seal to be pressed tightly against the interior surface of the central tubular portion.

The bypass flow valve may have an opening bounded by an annular reverse flow valve seat, and a reverse flow valve may be carried by the end cap and movable between a closed position seated against the reverse flow valve seat for blocking the opening and an open position spaced from the reverse flow valve seat for permitting flow of fluid through the opening.

The reverse flow valve may be resiliently biased toward its closed position, and the bypass flow valve may be resiliently biased toward its closed position, such that the reverse flow valve and bypass flow valve will move in tandem when the pressure differential across the reverse flow valve exceeds the biasing force acting on the bypass flow valve.

The end cap may have a central axially extending guide member, and the reverse flow valve may be a poppet valve guided for axial telescoping movement on the guide member.

The guide member may be located at the center of a spider support, and the spider support may have circumferentially offset legs connecting the center of the spider support to the central tubular portion.

The spider support and central tubular portion may be formed as separate parts that are joined together.

The end cap may be bonded to the end of the filter media.

The filter media may be tubular, and a second end cap may be bonded to an end of the filter media opposite the first end cap.

The end cap may have at least one radially deflectable latch device for engaging a catch on a housing to hold the end cap to the housing.

The central portion may have an annular groove retaining an annular seal for sealing to a wall of a socket in a filter head.

According to another aspect of the invention, a filter element comprises a filter media and an end cap assembly. The end cap assembly includes an end cap having a central portion forming with the filter media an interior passage and a bypass passage through the central portion for allowing fluid supplied to one side of the central portion to flow to an opposite side of the central portion without passing through the filter media. The end cap assembly further comprises a bypass flow valve movable between a closed position and an open position respectively blocking and permitting fluid to flow through the bypass passage. The bypass flow valve includes an outlet opening communicating the interior passage to outside the central portion. The assembly also includes a reverse flow valve carried by the end cap for closing and opening the outlet opening.

According to still another aspect of the invention, a filter element comprises a filter media and an end cap assembly. The end cap assembly comprises an end cap at one end of the filter media, the end cap including an annular peripheral flange portion for engaging an end face of the filter media, a central portion forming with the filter media an interior fluid flow passage, an outlet opening in the central portion. The end cap assembly further comprises a reverse flow valve carried by the end cap and movable from a closed position blocking the reverse flow passage and to an open position permitting flow of fluid through the reverse flow passage when fluid pressure at the outlet opening exceeds the pressure in the interior passage by a prescribed amount.

The present invention also provides a filter assembly comprising the filter element in combination with a filter head and a housing removably attachable to the filter head, the filter head and housing surrounding the filter element when the housing is attached to the filter head. The filter element may be removable from the housing, whereby the filter element can be replaced independently of the housing. The filter head may include an inlet passage and an outlet passage, and one of the inlet and outlet passages is in fluid communication with the bypass flow passage and the other is in fluid communication with the opening at the axial end of the central tubular portion.

Further features of the invention will become apparent from the following detailed description when considered in conjunction with the drawings.

BRIEF DESCRIPTION OF DRAWINGS

In the annexed drawings:

FIG. 6 is a top plan view of an exemplary filter end cap assembly used in the filter assembly of FIG. 1;

FIG. 7 is a bottom view of the filter end cap assembly of FIG. 6;

FIG. 8 is an enlarged fragmentary cross-sectional view showing details of a seal between a bypass valve and end cap wall used in the filter end cap assembly of FIG. 6;

FIG. 9 is an enlarged fragmentary cross-sectional view showing details of the bypass valve and associated valve seat in the filter end cap assembly of FIG. 6;

DETAILED DESCRIPTION

Figure 1:
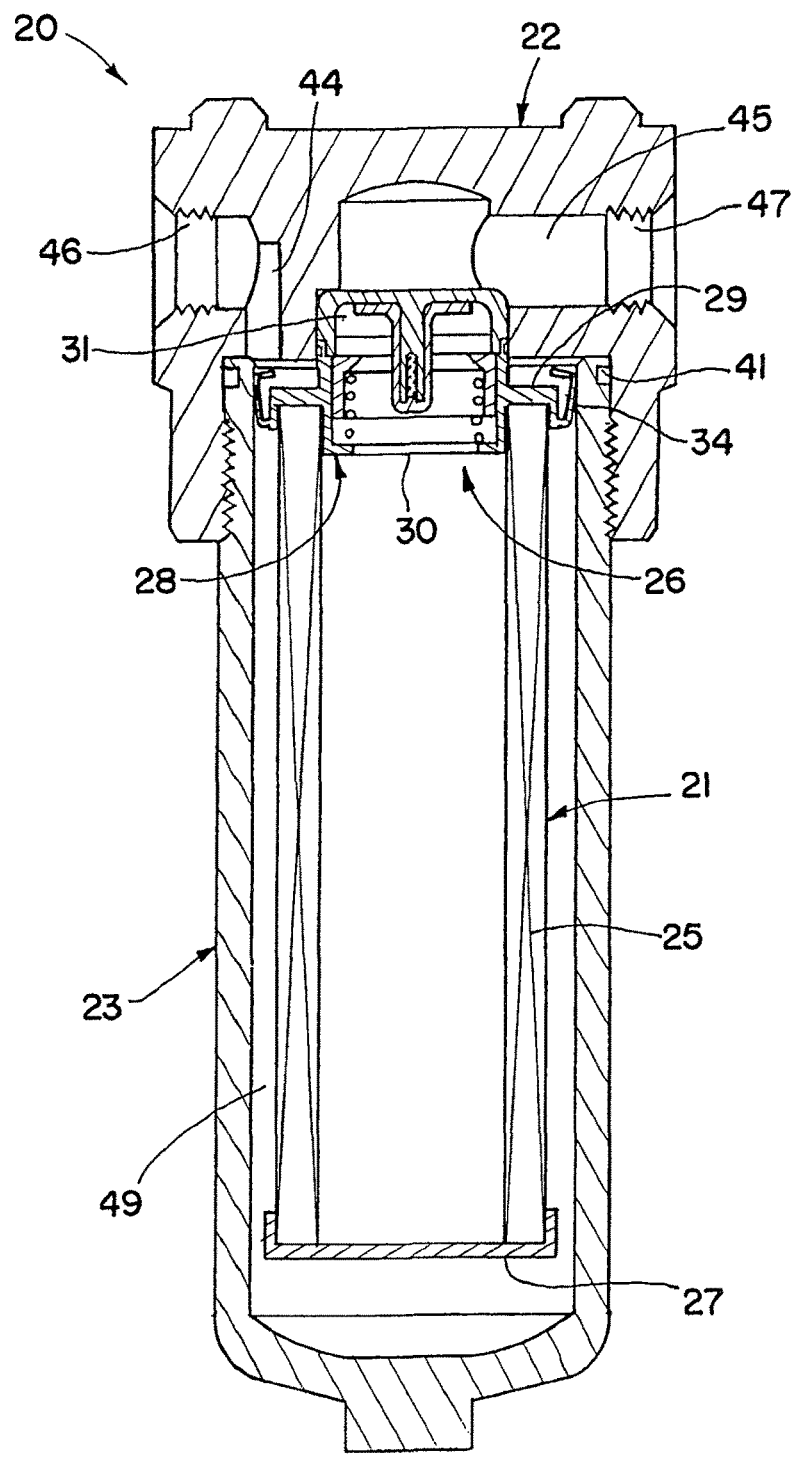
FIG. 1 is a cross-sectional view of an exemplary fluid filter assembly according to the invention.

Referring now to the drawings in detail and initially to FIG. 1, an exemplary filter assembly according to the invention is indicated generally by reference numeral 20. The filter assembly 20 generally comprises a filter element 21, a filter head 22 and a housing 23, which may also be referred to as a bowl or can. In a conventional manner, the housing 23 may be removably attached to the filter head 21 to form a chamber containing the filter element 21.

The filter element 21 generally comprises a filter media 25 that preferably is the form of a loop of filter media of any suitable type. The filter element further comprises an end cap assembly 26 at one end of the filter media and an end cap 27 at the opposite end of the filter media. The end cap assembly 26 includes an end cap 28 that has an annular peripheral flange portion 29 for engaging a juxtaposed end face of the filter media and a central portion 30 that has an opening 31 at an axially outer end thereof. The end caps 27 and 28 preferably are fixedly attached to the ends of the filter media, as by bonding with a suitable adhesive, this being a well known technique in the art.

The end cap 28 may be provided with one or more latch elements 34 for removably attaching the filter element to the housing 23. In the illustrated embodiment the latch elements 34 are in the form of resiliently deformable tangs that engage a catch formed by a recess or recesses 36 (FIG. 2) provided in the interior wall of the housing 23. The recess may be a single annular groove such that the filter element may be secured in the housing regardless of their relative rotation. The catch or recess may also be formed by an annular ledge or shoulder surface on the interior surface of the housing. The latch elements or tangs may be of any suitable number. In the illustrated embodiment, four circumferentially equally spaced tangs are provided, as shown in FIGS. 6 and 7. Other arrangements include, for example, a diametrically opposed pair of tangs or deflection members. Each tang is provided with a release arm 38 that may be used to urge the tangs out of engagement with the housing to enable removal of the filter element from the housing.

Although the filter element 21 is shown as being separable from the housing 23 as is preferred so that the housing can be reused and only the filter element replaced, the housing and filter element may be otherwise configured, such as an integral structure whereby both are replaced, as in the manner of a typical spin-on filter. Thus, the end cap 28 may be, for example, fixedly joined to the housing.

In the illustrated embodiment, the housing 23 is removably attached to the filter head 22 by screwing the housing onto the filter head. To this end, the housing and filter head are provided with correspondingly threaded portions. The threaded portions are coaxial with the housing and filter element which preferably are generally cylindrical in cross-section, as shown. The housing, however, may be removably secured to the filter head by other suitable means, such as by clamps, fasteners, etc. The housing is also provided with an annular groove 41 for containing an annular seal for sealing to the filter head. Other cross-sectional shapes of the filter element and/or housing are also contemplated.

The filter head 22 includes inlet and outlet passages 44 and 45 that may have associated therewith suitable ports, such as the illustrated threaded ports 46 and 47, for connection to other system components, such as fluid inlet and outlet lines. In most cases, the passage 46 will function as an inlet passage since it communicates with an annular space 49 in the housing that surrounds the filter element 21, as it is usually preferred that fluid flow through the filter media 25 of the filter element from outside to inside. Consequently, the passage 45 will function as an outlet passage. The opposite flow configuration is also contemplated, with the hereinafter components being configured to function under such opposite flow configuration.

When the housing 23 is attached to the filter head 22, the filter element 21 will be held in operative relation to filter head. In particular, the gap between the latching devices 34 will allow fluid to flow from the inlet passage 44 to the annular space 49 formed between the exterior surface of the filter element and interior surface of the housing. At the same time, the opening 31 in the central portion of the end cap will be in fluid communication with the outlet passage 45.

Figure 2:
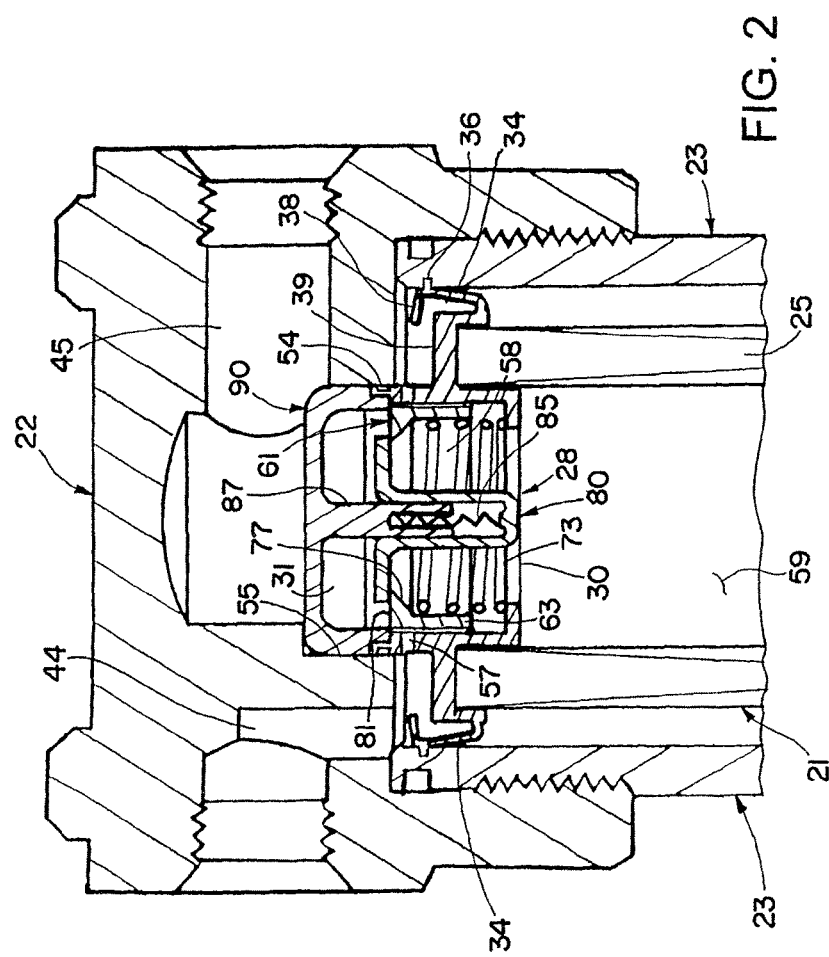
FIG. 2 is an enlarged fragmentary cross-sectional view of the fluid filter assembly in a no flow condition.

As shown, the central portion 30 preferably is tubular in shape with the opening 31 being formed at an axial end face thereof. The tubular central portion preferably is sealed to the filter head by suitable means, such as by an annular seal 54 that engages, as seen in FIG. 2, an interior annular surface of a socket 55 in the filter head 22 that is sized to closely receive an axially outer end portion of the central tubular portion. The annular seal 54 may be retained in an annular groove in the exterior surface of the tubular central portion as shown. In the case of the illustrated threaded connection between the housing and filter head, the central tubular portion and socket are, as is preferred, coaxial with the threaded portions of the filter head and housing.

With continued reference to FIG. 2, the tubular central portion 30 has in the tubular wall thereof one or more radial bypass flow passages 57 that provide for communication between the exterior of the central portion and the interior of the central portion that forms with the filter media an interior fluid flow passage 58. This interior fluid flow passage communicates or is common with the interior chamber 59 of the filter element. Flow through the bypass flow passages is controlled by a bypass flow valve 61 that is axially movable within the central tubular portion between a closed position blocking flow from the radial bypass flow passages to the opening 31 at the axial end of the central tubular portion and an open position permitting flow of fluid from the radial bypass flow passages to the opening at the axial end of the central tubular portion. In the illustrated embodiment, the bypass flow valve has a tubular portion 63 telescopically movable within the central tubular portion.

In the illustrated embodiment and as best shown in FIG. 9, the end cap has an annular bypass valve seat 66 surrounding the interior flow passage 58, and the bypass flow valve 61 has an annular valve sealing surface 67 for seating against the bypass valve seat to block flow from the radial bypass flow passages 57 to the opening at the axial end of the central tubular portion. The annular valve sealing surface may be formed by an axially protruding peripheral lip on the bypass flow valve. The peripheral lip may protrude from an axial end face of the tubular portion of the bypass flow valve.

In the illustrated exemplary embodiment and as best shown in FIG. 8, the tubular portion 63 of the bypass flow valve 61 has a radially outwardly protruding annular sealing portion 70 for sealing against an interior surface 71 of the central tubular portion 30 at a location remote from the peripheral lip. This sealing portion is exposed to pressure of fluid in the bypass flow passage and essentially acts like a piston head for moving the valve from its closed position to its open position when the pressure differential across the annular sealing portion exceeds a prescribed amount, as when the biasing force of a biasing element, such as a spring 73 (FIG. 2), is exceeded by the net fluid force acting on the bypass valve. The spring 73 functions to resiliently bias the valve element toward its closed position shown in FIG. 2, such that the bypass flow valve will be held in its closed position under no flow conditions. The bypass flow valve, however, is responsive to a prescribed pressure differential across the central tubular portion for moving the bypass flow valve from the closed position to the open position to permit flow through the bypass flow passage or passages 57. As shown in FIG. 8, the annular sealing portion 70 may be formed by a wiper seal oriented such that fluid pressure at its side in fluid communication with the bypass flow passage will cause the wiper seal to be pressed tightly against the interior surface of the central tubular portion.

Reverting to FIG. 2, the bypass flow valve 61 has an opening 77 through fluid can flow from the interior of the filter media to the opening 31 and out through the outlet 45 in the filter head 22. In the illustrated embodiment that also provides for reverse bypass flow, as is desirable for many hydraulic systems, the opening 77 is opened and closed by a reverse flow valve 80 that moves into and out of sealing engagement with an annular reverse flow valve seat 81 on the bypass flow valve that surrounds the opening 77. The reverse flow valve is carried by the end cap and is movable between a closed position seated against the reverse flow valve seat for blocking the opening 77 and an open position spaced from the reverse flow valve seat for permitting flow of fluid through the opening 77.

The reverse flow valve 80 is biased toward its closed position by suitable means, such as by a resilient spring 85. The reverse flow valve 80 and bypass flow valve 61, however will move in tandem when the pressure differential across the reverse flow valve exceeds the biasing force acting on the bypass flow valve.

As shown in FIG. 2, the end cap 28 has a central axially extending guide member 87, and the reverse flow valve 80 is a poppet valve guided for axial telescoping movement on the guide member. The poppet valve may have, as shown, a planar head portion and a tubular stem portion telescopically movable on the guide member. The biasing spring 85 may be housed in a central hole in the guide member 87 and interposed between axially opposed surfaces on the poppet valve and guide member. The guide member may be located at the center of a spider support 90, and the spider support may have circumferentially offset legs 91 (FIG. 6) connecting the center of the spider support to the central tubular portion. The spider support and central portion 30 may be formed as separate parts that are joined together after the bypass flow and reverse flow valves have been assembled therebetween.

Turning now to the operation of the valve element, FIG. 2 shows the position of the bypass flow valve 61 and reverse flow valve 80 under no flow conditions. The bypass flow valve is biased by the spring 73 to its closed position engaging the bypass flow valve seat 66 (FIG. 9), and the reverse flow valve 80 is biased by the spring 85 to its closed position engaging the reverse flow valve seat 81.

Figure 3:
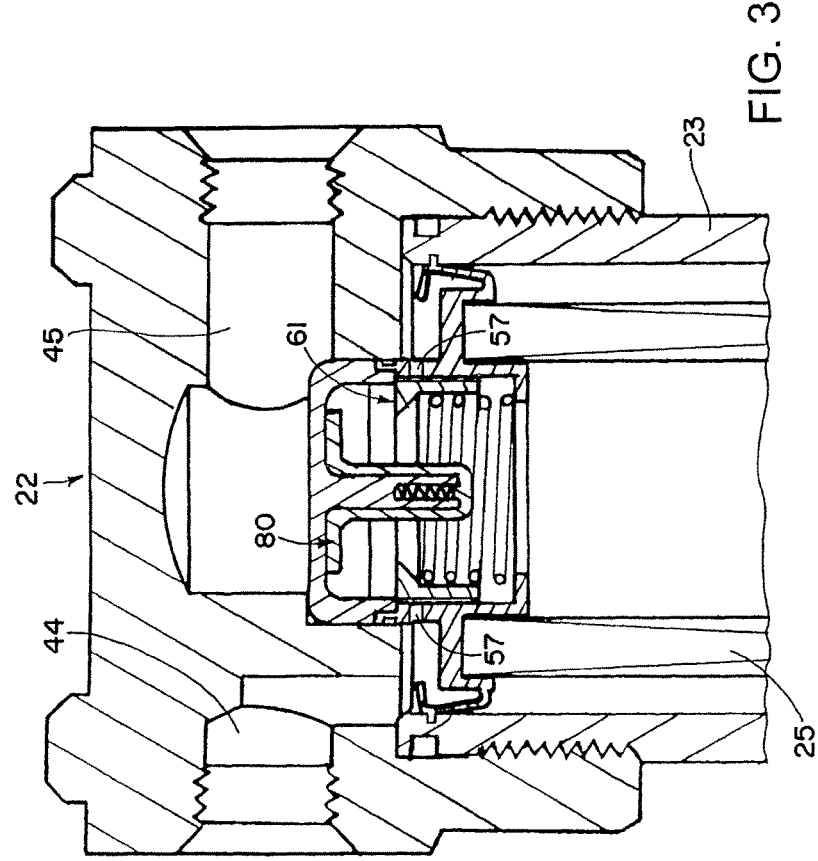
FIG. 3 is a cross-sectional view similar to FIG. 2, but showing the filter assembly in a normal flow condition.
Figure 4:
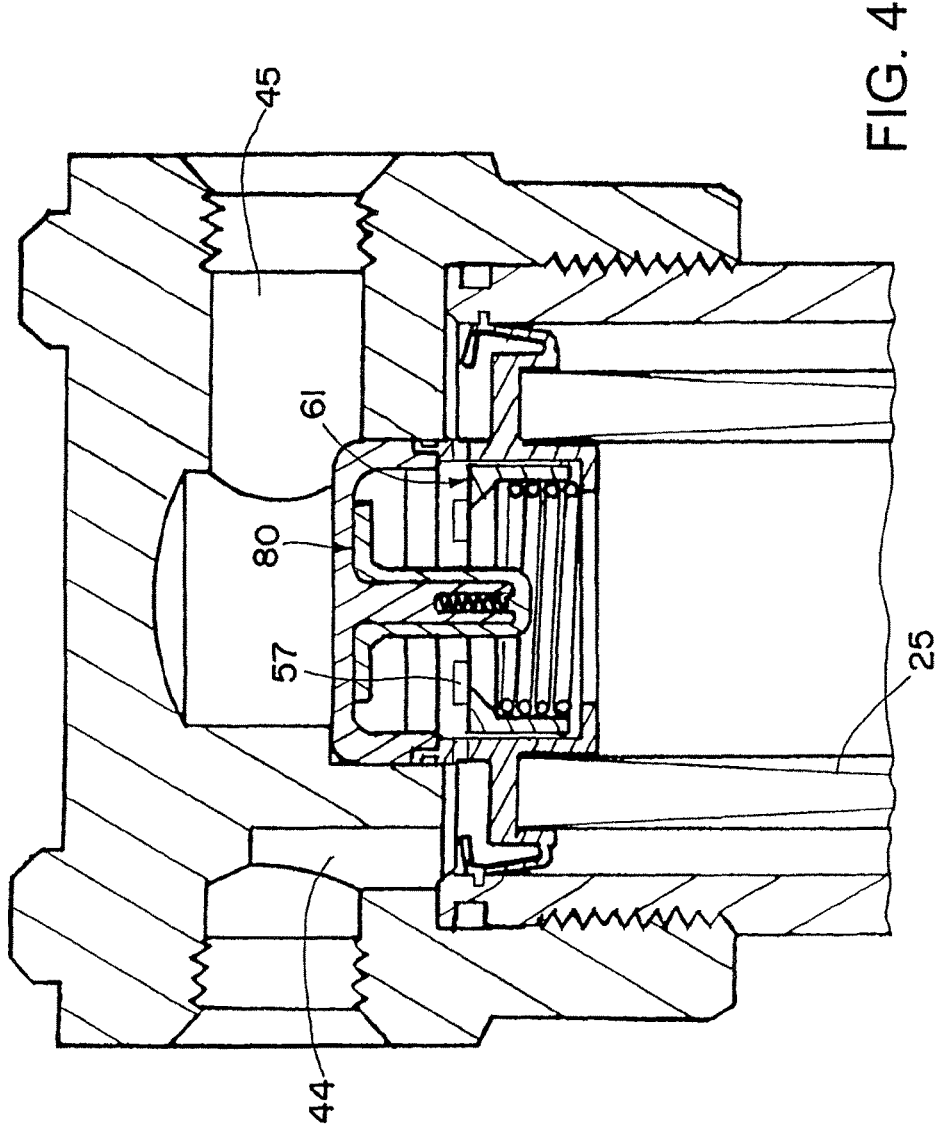
FIG. 4 is a cross-sectional view similar to FIG. 2, but showing the filter assembly in a bypass flow condition.

FIG. 3 illustrates a condition of the filter element end cap assembly when pressurized fluid is supplied to the inlet passage 44 for flow through the filter media 25 to remove contaminants from the fluid. The fluid will flow into the housing 23 around the filter media and then through the filter media 25 whereby it is filtered. Fluid pressure within the interior of the filter element will cause the reverse flow valve 80 to move to its open position thereby allowing the filtered fluid to exit through the outlet passage 45 in the filter head 22.

As the fluid media 25 becomes clogged, the pressure difference across the filter media will progressively increase. If the filter element is not replaced, at some point the differential pressure will exceed an acceptable level. At this point the pressure difference across the bypass flow valve 61 will cause the bypass flow valve to move axially away from its valve seat, thereby allowing bypass flow through the passages 57 in the central portion of the end cap and thus flow of fluid from the inlet passage 44 to the outlet passage 45 in the filter head along a path that does not pass through the filter media 25.

Figure 5:
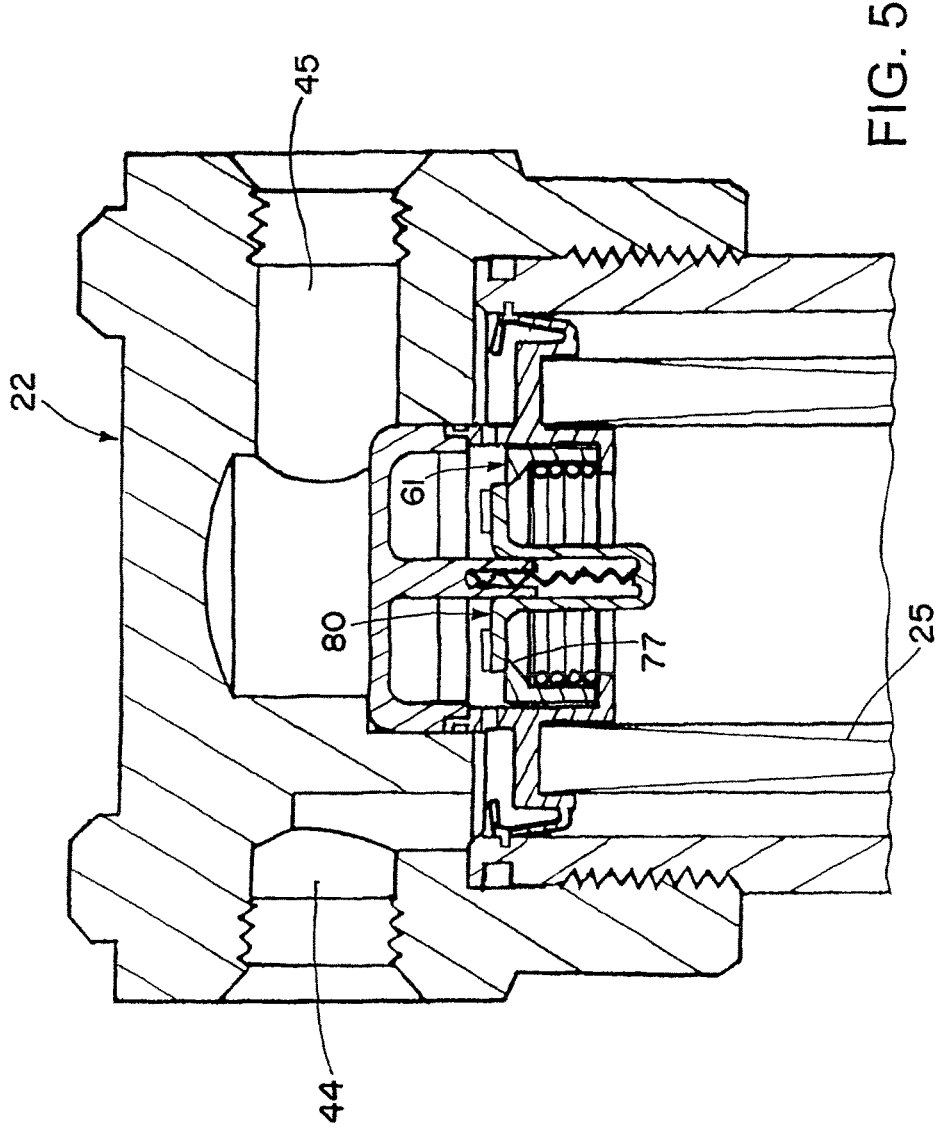
FIG. 5 is a cross-sectional view similar to FIG. 2, but showing the filter assembly in a reverse flow condition.

In FIG. 5, pressurized flow is no longer being supplied to the inlet passage 44 of the filter head 22. Forward flow through the filter element will no longer hold the reverse flow valve 80 open, in which case it will close against its valve seat and block flow through the opening 77 in the bypass flow valve 61. In the event the pressure at the outlet passage exceeds the inlet pressure by a prescribed amount, the pressure differential across the combination of the reverse flow valve and bypass flow valve will cause the bypass flow valve 61 to move away from its seat, thereby allowing reverse bypass flow directly from the outlet passage to the inlet passage without passage through the filter media 25.

Turning now to FIGS. 10-15, another embodiment of end cap assembly is indicated generally by reference numeral 126. The end cap assembly is substantially the same as the above-described end cap assembly 26, and consequently the same reference numerals, but indexed by 100, are used to denote structures corresponding to similar structures in the end cap assembly 26. In addition, the foregoing description is equally applicable to the end cap assembly 126 except as noted below. Thus, the end cap assembly 126 is intended to interface with a filter head and housing substantially as described above, and the end cap assembly 126 may form part of a filter element along with a filter media and bottom end cap (not shown) substantially as discussed above in connection with the end cap assembly 26.

Accordingly, the end cap assembly 126 includes an end cap 128 that has an annular peripheral flange portion 129 for engaging a juxtaposed end face of a tubular filter media and a central portion 130 that has an opening 131 at an axially outer end thereof. The end cap 128 may be provided with one or more latch elements 134 for removably attaching the filter element to a housing. In this embodiment, two diametrically opposed tangs are provided, as shown in FIG. 10.

Again, the central portion 130 may be tubular in shape with the opening 131 being formed at an axial end face thereof. The tubular central portion may be sealed to the filter head by suitable means, such as by an annular seal 154. The annular seal 154 may be retained in an annular groove in the exterior surface of the tubular central portion as shown.

Figure 10:
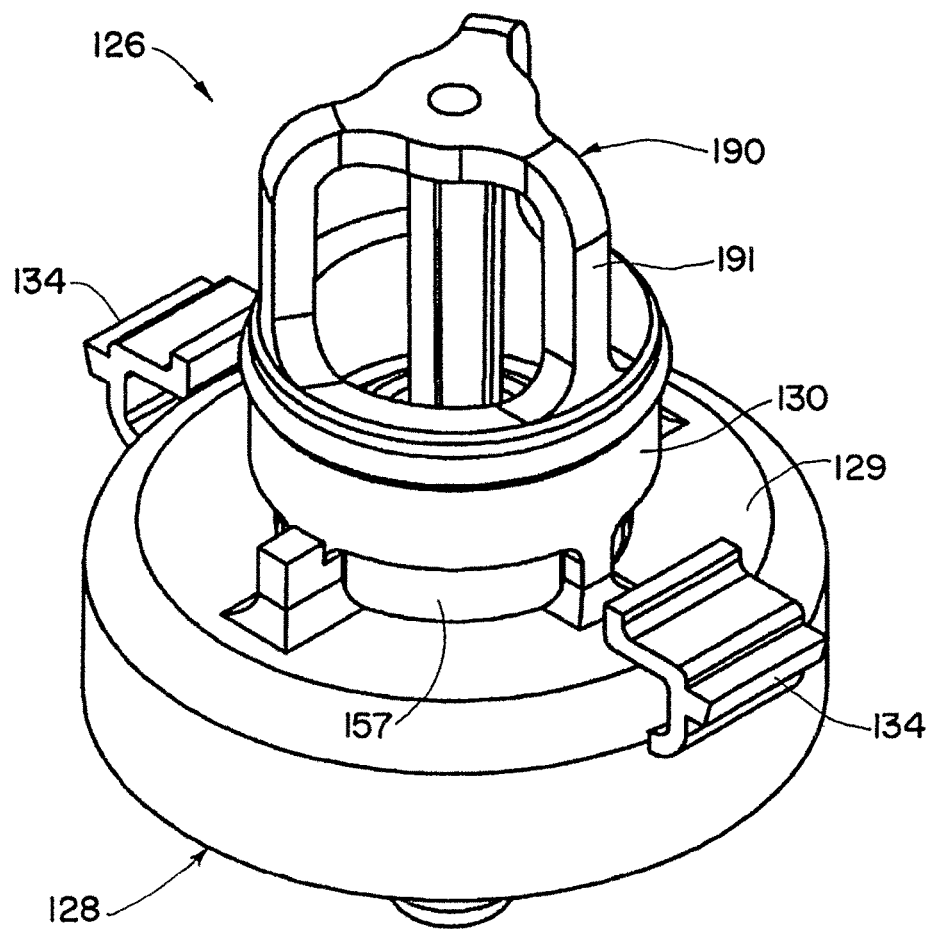
FIG. 10 is a perspective view of another end cap assembly according to the invention.
Figure 11:
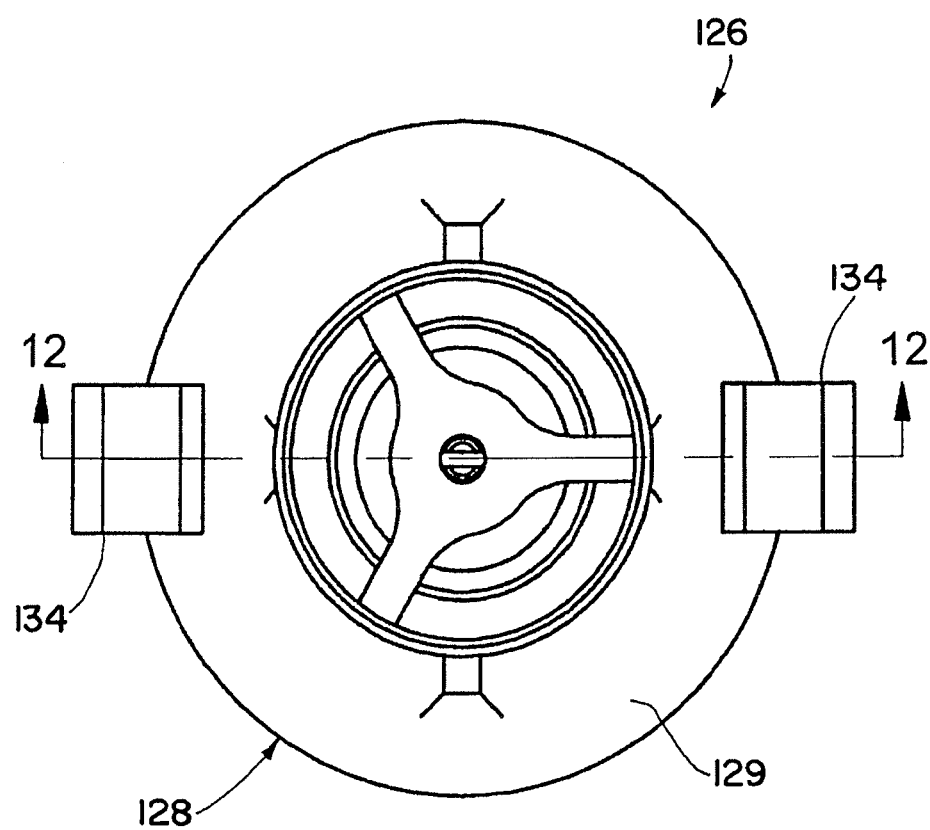
FIG. 11 is a plan view of the end cap assembly of FIG. 10.

As best seen in FIG. 10, the tubular central portion 130 has in the tubular wall thereof one or more radial bypass flow passages 157 that provide for communication between the exterior of the central portion and the interior of the central portion that forms with the filter media an interior fluid flow passage 158. This interior fluid flow passage communicates or is common with the interior chamber of the filter element (not shown). Flow through the bypass flow passages is controlled by a bypass flow valve 161 that is axially movable within the central tubular portion between a closed position blocking flow from the radial bypass flow passages to the opening 131 at the axial end of the central tubular portion and an open position permitting flow of fluid from the radial bypass flow passages to the opening at the axial end of the central tubular portion. As shown, the bypass flow valve may have a tubular portion 163 telescopically movable within the central tubular portion.

The end cap may have an annular bypass valve seat 166 surrounding the interior flow passage 158, and the bypass flow valve 161 has an annular valve sealing surface 167 for seating against the bypass valve seat to block flow from the radial bypass flow passages 157 to the opening at the axial end of the central tubular portion. The annular valve sealing surface may be formed by an axially protruding peripheral lip on the bypass flow valve. The peripheral lip may protrude from an axial end face of the tubular portion of the bypass flow valve.

The tubular portion 163 of the bypass flow valve 161 may have a radially outwardly protruding annular sealing portion 170 for sealing against an interior surface 171 of the central tubular portion 130 at a location remote from the peripheral lip. This sealing portion is exposed to pressure of fluid in the bypass flow passage and essentially acts like a piston head for moving the valve from its closed position to its open position when the pressure differential across the annular sealing portion exceeds a prescribed amount, as when the biasing force of a biasing element, such as a spring 173, is exceeded by the net fluid force acting on the bypass valve.

Figure 12:
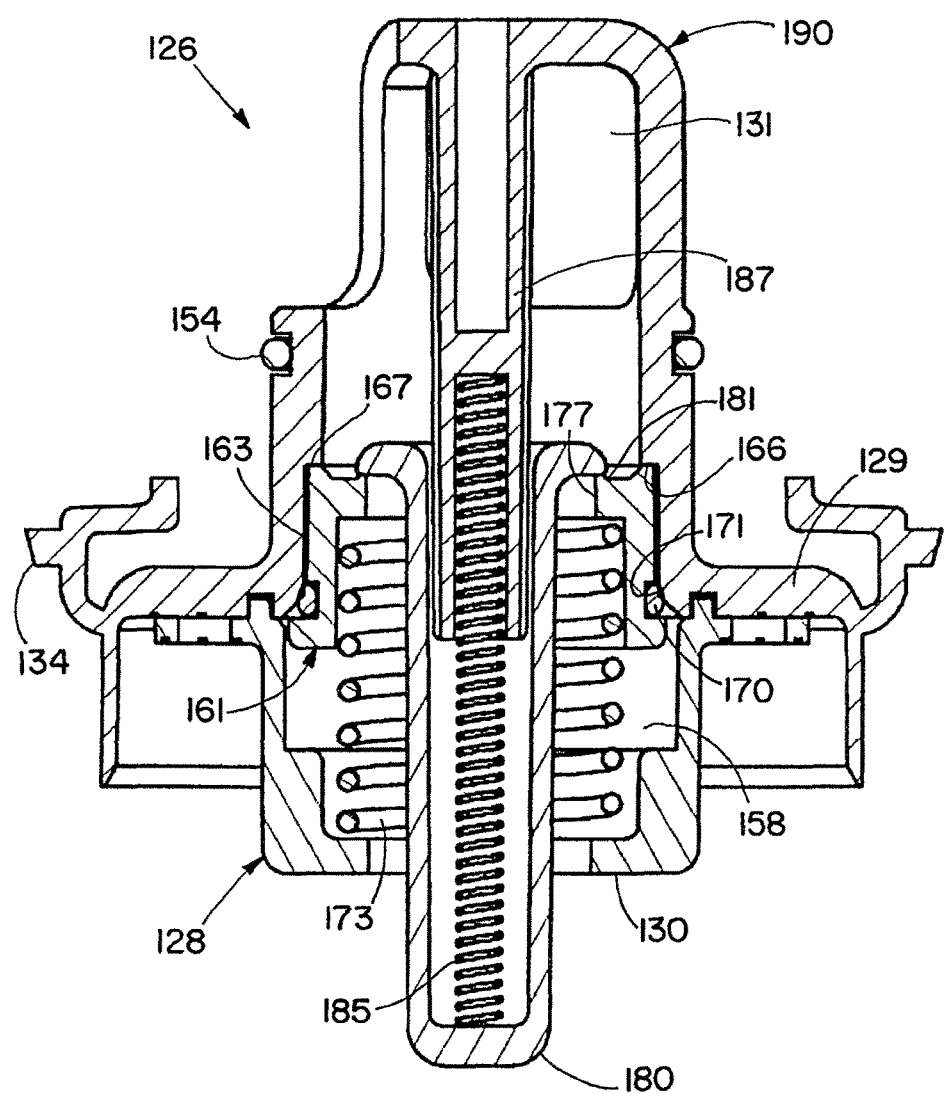
FIG. 12 is a cross-sectional view of the end cap assembly of FIG. 10, taken along the line 12-12 of FIG. 11, showing the end cap assembly in an at rest state.

The spring 173 functions to resiliently bias the valve element toward its closed position shown in FIG. 12, such that the bypass flow valve will be held in its closed position under no flow conditions. The bypass flow valve, however, is responsive to a prescribed pressure differential across the central tubular portion for moving the bypass flow valve from the closed position to the open position to permit flow through the bypass flow passage or passages 157. In the end cap assembly 26, the annular sealing portion is formed by a wiper seal. In the end cap assembly 126, the annular sealing portion 170 is formed by an annular seal, such as an O-ring, that may be captured in an annular recess. As further seen in FIG. 12, the interior surface 171 of the central tubular portion 130 may be stepped at a tapered shoulder or chamfer, such that movement of the bypass valve out of its closed position in FIG. 12 will move the seal 170 out of sealing engagement with the interior surface 171 for relatively friction-free movement of the bypass valve against the biasing force of the spring 173.

The bypass flow valve 161 may have an opening 177 through fluid can flow from the interior of the filter media (not shown) to the opening 131 and out through the outlet in the filter head (not shown). In the illustrated embodiment that also provides for reverse bypass flow, as is desirable for many hydraulic systems, the opening 177 is opened and closed by a reverse flow valve 180 including an enlarged valve head portion that moves into and out of sealing engagement with an annular reverse flow valve seat 181 on the bypass flow valve that surrounds the opening 177. The reverse flow valve is carried by the end cap and is movable between a closed position seated against the reverse flow valve seat for blocking the opening 177 and an open position spaced from the reverse flow valve seat for permitting flow of fluid through the opening 177.

The reverse flow valve 180 is biased toward its closed position by suitable means, such as by a resilient spring 185. The reverse flow valve 180 and bypass flow valve 161, however will move in tandem when the pressure differential across the reverse flow valve exceeds the biasing force acting on the bypass flow valve.

As shown in FIG. 12, the end cap 128 has a central axially extending guide member 187, and the reverse flow valve 180 is a poppet valve guided for axial telescoping movement on the guide member. The poppet valve may have, as shown, a planar head portion and a tubular stem portion telescopically movable on the guide member. The biasing spring 185 may be housed in a central hole in the guide member 187 and interposed between axially opposed surfaces on the poppet valve and guide member. The guide member may be located at the center of a spider support 190, and the spider support may have circumferentially offset legs 191 connecting the center of the spider support to the central tubular portion. In this embodiment, the spider support and an upper portion of the central portion 130 are formed as a unitary piece that is assembled to a lower portion of the central portion that has a flange attached to the underside of the flange 139.

Turning now to the operation of the end cap assembly, FIG. 12 shows the position of the bypass flow valve 161 and reverse flow valve 180 under no flow conditions. The bypass flow valve is biased by the spring 173 to its closed position engaging the bypass flow valve seat 166, and the reverse flow valve 180 is biased by the spring 185 to its closed position engaging the reverse flow valve seat 181.

Figure 13:
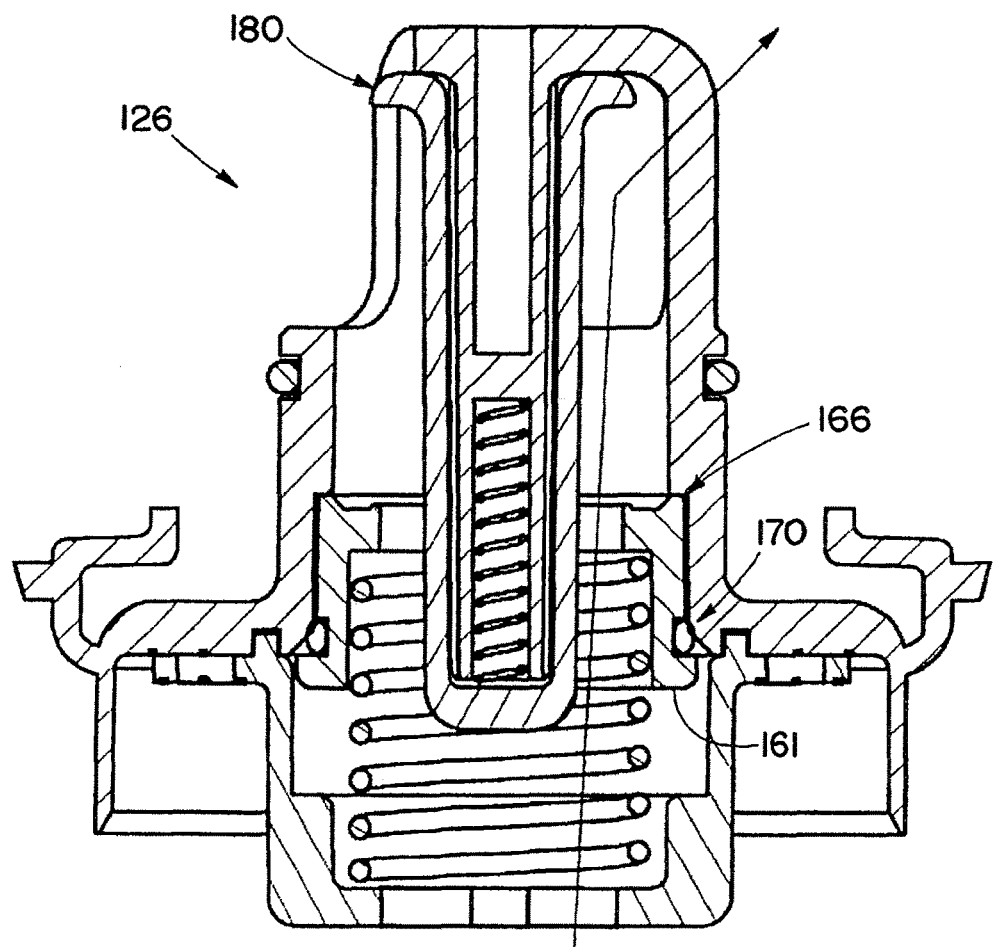
FIG. 13 is a cross-sectional view similar to FIG. 12, but showing the end cap assembly in a forward flow-no bypass state.

FIG. 13 illustrates a condition of the filter element end cap assembly when pressurized fluid is supplied to the inlet passage of the filter head (not shown) for flow through the filter media (not shown) to remove contaminants from the fluid. The fluid will flow into the housing around the filter media and then through the filter media whereby it is filtered, as in the manner described above in connection with the end cap assembly 126. Fluid pressure within the interior of the filter element will cause the reverse flow valve 180 to move to its open position thereby allowing the filtered fluid to exit through the outlet passage in the filter head.

Figure 14:
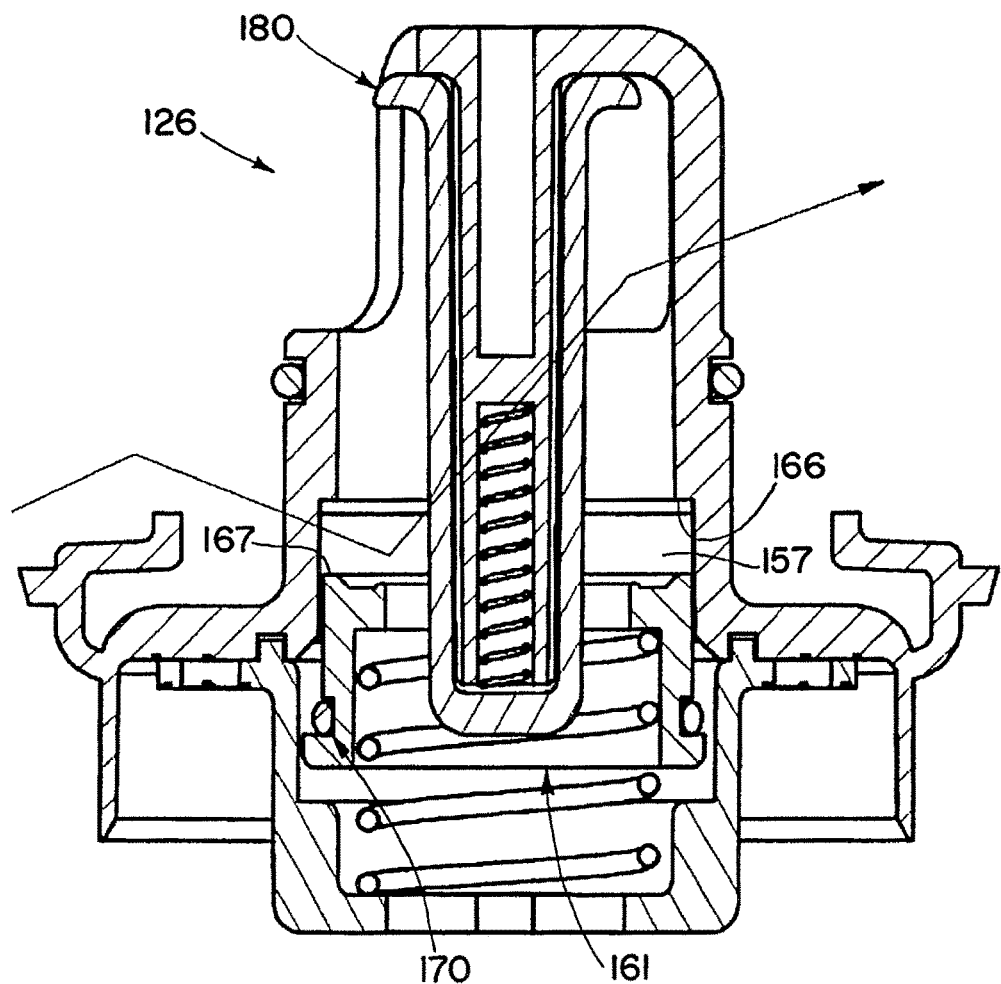
FIG. 14 is a cross-sectional view similar to FIG. 12, but showing the end cap assembly in a forward flow-element-in-bypass state.

As the fluid media becomes clogged, the pressure difference across the filter media will progressively increase. If the filter element is not replaced, at some point the differential pressure will exceed an acceptable level. At this point the pressure difference across the bypass flow valve 161 will cause the bypass flow valve to move axially away from its valve seat as seen in FIG. 14, thereby allowing bypass flow through the passages 157 in the central portion of the end cap and thus flow of fluid from the inlet passage to the outlet passage in the filter head along a path that does not pass through the filter media.

Figure 15:
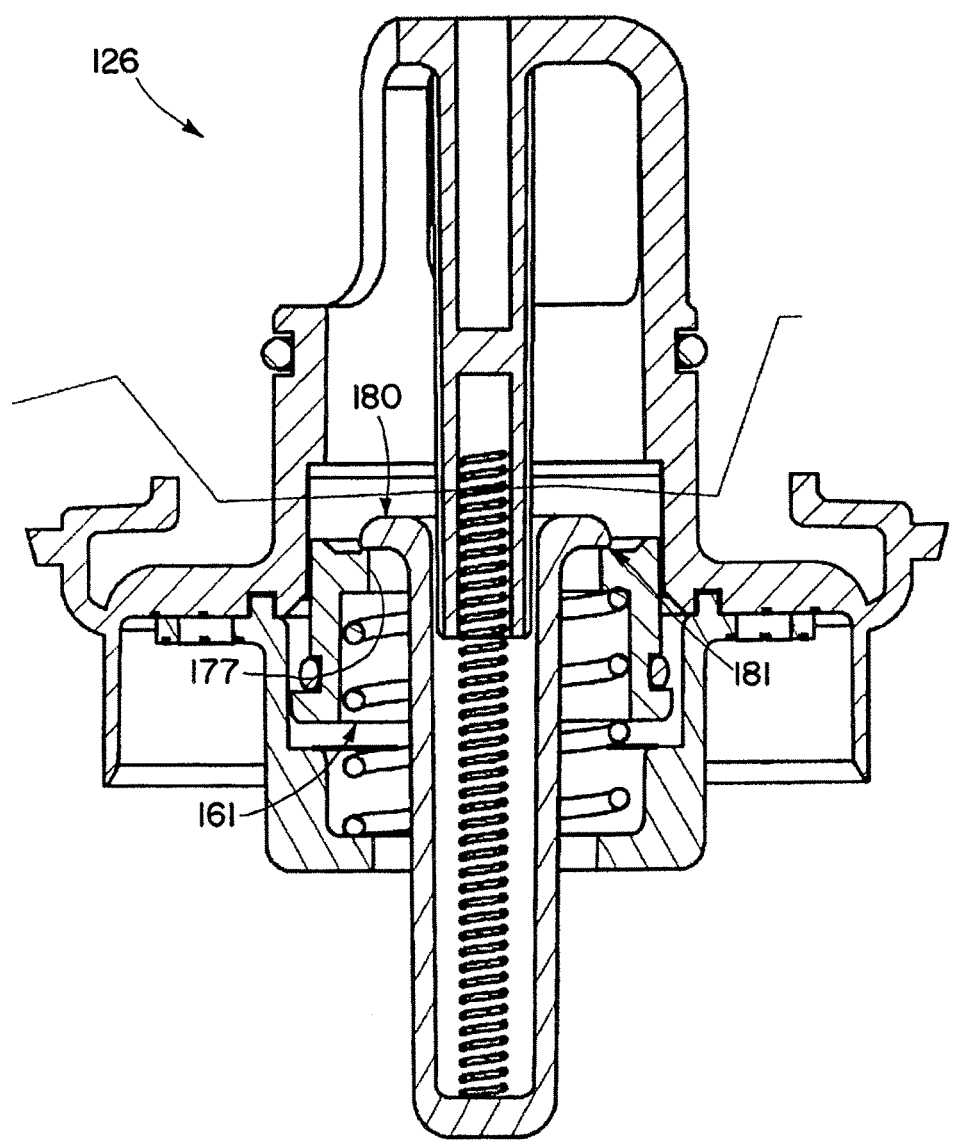
FIG. 15 is a cross-sectional view similar to FIG. 12, but showing the end cap assembly in a reverse flow state.

When pressurized flow is no longer being supplied to the inlet passage of the filter head, forward flow through the filter element will no longer hold the reverse flow valve 180 open, in which case it will close against its valve seat and block flow through the opening 177 in the bypass flow valve 161. In the event the pressure at the outlet passage exceeds the inlet pressure by a prescribed amount, the pressure differential across the combination of the reverse flow valve and bypass flow valve will cause the bypass flow valve 161 to move away from its seat as seen in FIG. 15, thereby allowing reverse bypass flow directly from the outlet passage to the inlet passage without passage through the filter media.

As will be appreciated by those skilled in the art, filter elements and assemblies utilizing one or more of the principles of the herein described invention may be used in a variety of applications for filtering a fluid (gas or liquid), in particular a liquid such as lubricating oil, hydraulic fluid, etc. The filter elements and assemblies will be found to have particular application to filtering hydraulic liquid in hydraulic systems.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filter element that can be removably attached to a filter head comprising a filter media, and an end cap assembly at one end of the filter media and carried with the filter media whereby the end cap assembly will be removable with the filter media when the filter element is removed from the filter head; the end cap assembly including an end cap that includes an annular peripheral flange portion for engaging an end face of the filter media, and a central tubular portion forming with the filter media an interior fluid flow passage, the central tubular portion having an opening at an axial end thereof and an annular wall including at least one radial bypass flow passage for allowing fluid supplied to one side of the central tubular portion to bypass the filter element and flow to an opposite side of the central tubular portion; and a bypass flow valve axially movable within the central tubular portion between a closed position blocking flow from the radial bypass flow passage to the opening at the axial end of the central tubular portion during normal forward flow that flows from an inlet passage of the filter head to an outlet passage of the filter head and passes the filter media, and an open position permitting flow of fluid from the radial bypass flow passage to the opening at the axial end of the central tubular portion during bypass forward flow that flows from the inlet passage of the filter head to the outlet passage of the filter head and bypasses the filter media, and wherein the bypass flow valve is responsive to a prescribed pressure differential across the central tubular portion for moving the bypass flow valve from the closed position to the open position to permit flow through the bypass flow passage, the bypass flow valve has an opening bounded by an annular reverse flow valve seat that is integral with the bypass flow valve, and a reverse flow valve is carried by the end cap and movable between a closed position seated against the reverse flow valve seat for blocking the opening during reverse flow that flows from the outlet passage of the filter head to the inlet passage of the filter head and an open position spaced from the reverse flow valve seat for permitting flow of fluid through the opening during the normal forward flow and the bypass forward flow, wherein reverse flow that bypasses the filter media is enabled when the bypass flow valve is in the open position.

2. A filter element as set forth in claim 1, wherein the end cap has an annular bypass valve seat surrounding the interior flow passage, and the bypass flow valve has an annular valve sealing surface for seating against the bypass valve seat to block flow from the radial bypass flow passage to the opening at the axial end of the central tubular portion.

3. A filter element as set forth in claim 2, wherein the annular valve sealing surface is formed by an axially protruding peripheral lip on the bypass flow valve.

4. A filter element as set forth in claim 3, wherein the bypass flow valve has a tubular portion telescopically movable within the central tubular portion, and the peripheral lip protrudes from an axial end face of the tubular portion of the bypass flow valve.

5. A filter element as set forth in claim 4, wherein the tubular portion has a radially outwardly protruding annular sealing portion for sealing against an interior surface of the central tubular portion at a location remote from the peripheral lip, which sealing portion is exposed to pressure of fluid in the bypass flow passage.

6. A filter element as set forth in claim 5, wherein the bypass flow valve is resiliently biased toward its closed position, such that the bypass flow valve will be held in its closed position until the pressure differential across the annular sealing portion exceeds a prescribed amount causing the bypass flow valve to move to its open position.

7. A filter element as set forth in claim 6, wherein the annular sealing portion is formed by a wiper seal oriented such that fluid pressure at its side in fluid communication with the bypass flow passage will cause the wiper seal to be pressed tightly against the interior surface of the central tubular portion.

8. A filter element as set forth in claim 1, wherein the reverse flow valve is resiliently biased toward its closed position, and the bypass flow valve is resiliently biased toward its closed position, such that the reverse flow valve and bypass flow valve will move in tandem when the pressure differential across the reverse flow valve exceeds the biasing force acting on the bypass flow valve.

9. A filter element as set forth in claim 8, wherein the end cap has a central axially extending guide member, and the reverse flow valve is a poppet valve guided for axial telescoping movement on the guide member.

10. A filter element as set forth in claim 9, wherein the guide member is located at the center of a spider support, and the spider support has circumferentially offset legs connecting the center of the spider support to the central tubular portion.

11. A filter element as set forth in claim 10, wherein the spider support and central tubular portion are formed as separate parts that are joined together.

12. A filter element as set forth in claim 1, in combination with a filter head and a housing removably attachable to the filter head, the filter head and housing surrounding the filter element when the housing is attached to the filter head.

13. A combination as set forth in claim 12, wherein the filter element is removable from the housing, whereby the filter element can be replaced independently of the housing.

14. A combination as set forth in claim 12, wherein one of the inlet and outlet passages is in fluid communication with the bypass flow passage and the other is in fluid communication with the opening at the axial end of the central tubular portion.

15. A combination as set forth in claim 12, wherein the central tubular portion has an annular groove retaining an annular seal for sealing to a wall of a socket in the filter head.

16. A filter element that can be removably attached to a filter head, the filter element comprising a filter media and an end cap assembly carried with the filter media whereby the end cap assembly will be removable with the filter media when the filter element is removed from the filter head; the end cap assembly including an end cap at one end of the filter media, the end cap including a central portion forming with the filter media an interior passage and a bypass passage through the central portion for allowing fluid supplied to one side of the central portion to flow to an opposite side of the central portion without passing through the filter media; a bypass flow valve movable between a closed position during normal forward flow from an inlet passage of the filter head to an outlet passage of the filter head and an open position during bypass forward flow from the inlet passage of the filter head to the outlet passage of the filter head respectively blocking and permitting fluid to flow through the bypass passage, the bypass flow valve including an outlet opening communicating the interior passage to outside the central portion, the outlet opening being surrounded by an annular reverse flow valve seat that is integral with the bypass flow valve; and a reverse flow valve carried by the end cap for closing the opening during reverse flow that occurs in an opposite flow direction relative to the forward flow and opening the outlet opening during the normal forward flow and the bypass forward flow, wherein reverse flow that bypasses the filter media is enabled when the bypass flow valve is in the open position.

17. A filter element as set forth in claim 1, wherein the end cap is bonded to the end of the filter media.

18. A filter element as set forth in claim 1, wherein the filter media is tubular, and a second end cap is bonded to an end of the filter media opposite the first end cap.

19. A filter element as set forth in claim 1, wherein the end cap has at least one radially deflectable tang for engaging a catch on a housing to hold the end cap to the housing.

20. A filter element as set forth in claim 16, wherein the filter media defines an interior chamber and the central portion of the end cap has a tubular wall that forms the interior passage communicating with the interior chamber, and the bypass passage is a radial bypass passage through the tubular wall of the central portion, in which the end cap provides an annular bypass valve seat which surrounds the interior passage,
- wherein the bypass flow valve has an annular valve sealing surface which is moveable between a closed position in which the sealing surface is in contact with the annular bypass valve seat that is provided by the end cap, and an open position in which the sealing surface is separated from the valve seat, respectively blocking and permitting fluid to flow through the bypass passage and being biased towards the closed position, the bypass flow valve including the outlet opening communicating the interior passage to outside the central portion for forward flow from the interior passage to outside the central portion,
- wherein the reverse flow valve is moveable between a closed position in which the reverse flow valve contacts the annular reverse flow valve seat provided by the bypass valve to close the opening to prevent reverse flow from outside the central portion to the interior passage and an open position in which the outlet opening is open to allow forward flow from the interior passage to outside the central portion without passage through the filter media, and being resiliently biased towards the closed position, and
- wherein the reverse flow valve and the bypass flow valve move in tandem in the filter element when the reverse gas flow pressure exceeds the biasing force acting on the bypass flow valve in the closing direction.

* * * * *